United States Patent [19]

Henry

[11] 4,064,061
[45] Dec. 20, 1977

[54] CLEANING CLOTH COMPOSITION
[75] Inventor: James M. Henry, McEwen, Tenn.
[73] Assignee: Magi-Cloth, Inc., McEwen, Tenn.
[21] Appl. No.: 758,099
[22] Filed: Jan. 4, 1977
[51] Int. Cl.² .......................... C09G 1/02; C09G 1/08; C11D 9/20; C11D 17/04
[52] U.S. Cl. .......................................... 252/91; 106/8; 106/10; 106/11; 252/118; 252/119; 252/120; 252/124; 252/129; 252/131; 252/154; 252/155; 15/104.93
[58] Field of Search ................. 106/8, 10, 11; 252/91, 252/113, 114, 117, 119, 120, 123, 131, 154, 155, 124, 129; 15/104.93

[56] References Cited
U.S. PATENT DOCUMENTS

| 885,542 | 4/1908 | Stevens | 252/119 |
| 972,638 | 10/1910 | Pease | 252/119 |
| 1,143,614 | 6/1915 | Criswell | 252/119 |
| 1,515,950 | 11/1924 | Hildenbrand | 252/119 |
| 2,295,132 | 9/1942 | Sharp | 106/8 |
| 2,403,821 | 7/1946 | Morgan | 252/91 |
| 2,691,593 | 10/1954 | Avedikian | 106/5 |
| 2,907,664 | 10/1959 | Schoenholz | 106/10 |
| 2,956,888 | 10/1960 | Gunning | 106/10 |
| 3,071,479 | 1/1963 | Fulenwider | 106/10 |
| 3,447,935 | 6/1969 | Marley | 106/8 |

Primary Examiner—Dennis L. Albrecht
Attorney, Agent, or Firm—David H. Semmes

[57] ABSTRACT

An abrasive and polishing cleaning composition of the type used for impregnating cleaning cloths, buffing pads and the like, characterized by its effectiveness in polishing and its durable protection of the polished surface.

6 Claims, No Drawings

CLEANING CLOTH COMPOSITION

BACKGROUND OF THE INVENTION

1. Field of the Invention

Abrasive and polishing compositions, of the type used for impregnating cleaning cloths, buffing pads and the like for polishing of metal, glass, plastics and the like particularly a composition for removing surface discoloration while providing a protective wax coating.

2. Description of Prior Art

The following prior U.S. Pat. Nos. are representative of the prior art: HILDENBRAND 1,515,950, SCHOENHOLZ 2,907,664, GUNNING 2,956,888, SHARP 2,295,132, FULENWIDER 3,071,479, MARLEY 3,447,935.

Hildenbrand sets forth a metal polish composition including marble dust, water, aqua-ammonia, kerosene, Oleic acid and lemon oil.

Schoenholz discloses a self-spraying wax polish including wax, volatile organic solvent, water and emulsifiers.

Sharp indicates that a cleaning and polishing composition for automobiles can comprise oil, oleum spirits, wax, Oleic acid, borax, water and semilite.

Gunning discloses a waxing composition for automobile chrome parts, including wax, barium petronate, oil, morphiline, Oleic acid, snowfloss, mineral spirits and water.

Fulenwider teaches a combination cleaning polishing composition for lacquered or enameled surfaces. The material consists essentially of wax, abrasive, oil and organic solvent.

Marley sets forth a fluid polishing composition for removing surface discoloration and providing a protective wax coating. The composition consists of paraffin wax, hydrocarbon solvent, triethanolamine, Oleic acid, ammonia water, abrasive material and water. At column 4, lines 34-36, Marley states that the composition is spread on a dry cloth prior to application.

Although the foregoing references suggest the use of combining mineral oil, ammonia, silica and wax, they do not suggest the employment of stearic acid. Further, the proportions of ingredients in the present composition are not remotely suggested.

SUMMARY OF THE INVENTION

According to the present invention, a cleaning composition for use in impregnating cleaning cloth, buffing pads and the like is prepared so as to include mineral oil, aqua-ammonia, powdered silica, crystalline stearic acid and paraffin wax. The composition is mixed and heated at 125° F. Then the requisite cleaning cloth or buffing pad is dipped therein for impregnation. The composition is particularly effective in removal of oxidation from metal, scratches from plastic, while leaving a paraffin and protective residue.

DESCRIPTION OF THE PREFERRED EMBODIMENT

The solution is prepared by mixing and heating at 125° F the following ingredients:

Mineral Oil: 48 gals.
Aqua Ammonia: 7 1/2 gals.
Powdered Silica: 900 lbs.
Crystalline Stearic Acid: 900 lbs.
Paraffin Wax: 300 lbs.

The cleaning cloth or buffing pad is then dipped into the solution and permitted to dry.

A cleaning cloth impregnated with the solution is characterized by its superior cleaning and preserving capabilities. The composition by means of its abrasives and the use of the aqua-ammonia and stearic acid literally lifts out oxidized portions of the metal and by buffing or polishing literally resurfaces silver, metals and the like. The composition may be used in cleaning cloths for plastics, glass, bowling balls and the like. Manifestly, the composition may be used with scoring pads and mediums other than cleaning cloths, without departing from the spirit and scope of invention.

I claim:

1. A cleaning composition, formulated by heating and mixing ingredients in the following proportions:

Mineral Oil: 48 gals.
Ammonia: 7 1/2 gals.
Powdered Silica: 900 lbs.
Crystalline Stearic Acid: 900 lbs.
Paraffin Wax: 300 lbs.

2. A cleaning composition as in claim 1, wherein the composition is heated and mixed at 125° F.

3. A cleaning cloth prepared by dipping of said cloth into the heated and mixed composition of claim 1.

4. A cleaning cloth as in claim 2, said cloth being double knap cotton.

5. A buffer pad impregnated with the cleaning composition of claim 1.

6. A cleaning composition as in claim 1, including coloring dyes.

* * * * *